United States Patent Office 2,957,892
Patented Oct. 25, 1960

2,957,892
PROCESS OF MAKING 2,2,4-TRIBROMO-ALLODI-HYDROCORTISONE ESTERS

Evelyn H. Wilson, East Orange, and Max Tishler, Westfield, N.J., assignors to Merck & Co., Inc., Rahway, N.J., a corporation of New Jersey No Drawing. Filed July 19, 1952, Ser. No. 299,902

5 Claims. (Cl. 260—397.45)

This invention is concerned with the preparation of $\Delta^4$-3-ketosteroids from 3-ketoallosteroids by new and novel processes and is also concerned with the preparation of new intermediates useful in these new processes.

It is an object of this invention to provide a novel means for introducing a double bond between the carbons located in the 4 and 5 positions of 3-ketosteroids. The introduction of a $\Delta^4$ is useful in the total synthesis of cortisone and is particularly useful for converting natural 3-ketoallosteroids to $\Delta^4$-3-ketosteroids. The introduction of the $\Delta^4$ makes possible the formation of $\Delta^4$-3-ketosteroids which structure in ring A is essential, in part, to any physiological activity possessed by steroids such as cortisone. This invention also makes possible the preparation of cortisone from 3-ketoallopregnanes.

Another object of this invention is to provide intermediates which may be useful in the total synthesis of cortisone.

In general the introduction of the $\Delta^4$ structure into a steroid molecule is achieved by the novel process which comprises reacting a member of the class consisting of 3-ketoallosteroid; 2,2-dibromo-3-ketoallosteroid; 2-bromo-3-keto-allosteroid; 2,4-dibromo-3-ketosteroid; 4-bromo-3-keto-allosteroid with sufficient bromine to produce 2,2,4-tribromo - 3 - ketoallosteroid, dehydrobrominating said 2,2,4-tribromo-3-keto-allosteroid to produce 2-iodo-$\Delta^4$-3-ketosteroid, and reducing the 2-iodo-$\Delta^4$-3-ketosteroid to $\Delta^4$-3-ketosteroid.

In a preferred embodiment of the present invention, those allosteroids are used which contain no bromine substituents at the 2 or 4 positions, and the bromination, using three moles of bromine, is carried out in a nonpolar organic solvent, such as chloroform or carbon tetrachloride. It is an important element in this preferred bromination reaction that three moles of bromine be used in order to produce the desired 2,2,4-tribromo compound.

Dehydrobromination of 2,2,4 - tribromo - 3 - ketoallosteroids to produce 2-iodo-$\Delta^4$-3-ketosteroids is accomplished by dissolving the tribromo steroid in acetone and reacting with sodium iodide, preferably under an inert atmosphere, although this is not essential as the reaction is operative under normal conditions.

Reduction of the 2-iodo-$\Delta^4$-3-ketosteroid may be effected by known processes, such as are described by Rosenkranz et al. in J.A.C.S. 72, 4077 (1950), who show the reduction of a 2-iodo-$\Delta^4$-3-ketosteroid to a $\Delta^4$-3-ketosteroid.

As a specific embodiment of the invention and its application to the introduction of a $\Delta^4$ in 3-ketosteroids by use of the new 2,2,4-tribromo-3-ketoallosteroid compounds and the new processes useful in the preparation of this group of new compounds, a 3-ketoallosteroid, such as 3,11,20-triketo-17α-hydroxy-21-acetoxy allopregnane (I) may be reacted with three moles of bromine in the presence of chloroform, producing the new compound 2,2,4 - tribromo - 3,11,20 - triketo - 17 - α - hydroxy -21-acetoxy-allopregnane (II) which, when dissolved in acetone, may be dehydrobrominated upon refluxing with sodium iodide to produce 2-iodo-$\Delta^4$-3,11,20-triketo-17-α-hydroxy-21-acetoxy allopregnene (III), a compound which may be reduced by use of known methods to $\Delta^4$ - 3,11,20 - triketo - 17 - α - hydroxy - 21 - acetoxy pregnene (IV), commonly called cortisone acetate. This sequence of reactions may be illustrated as follows:

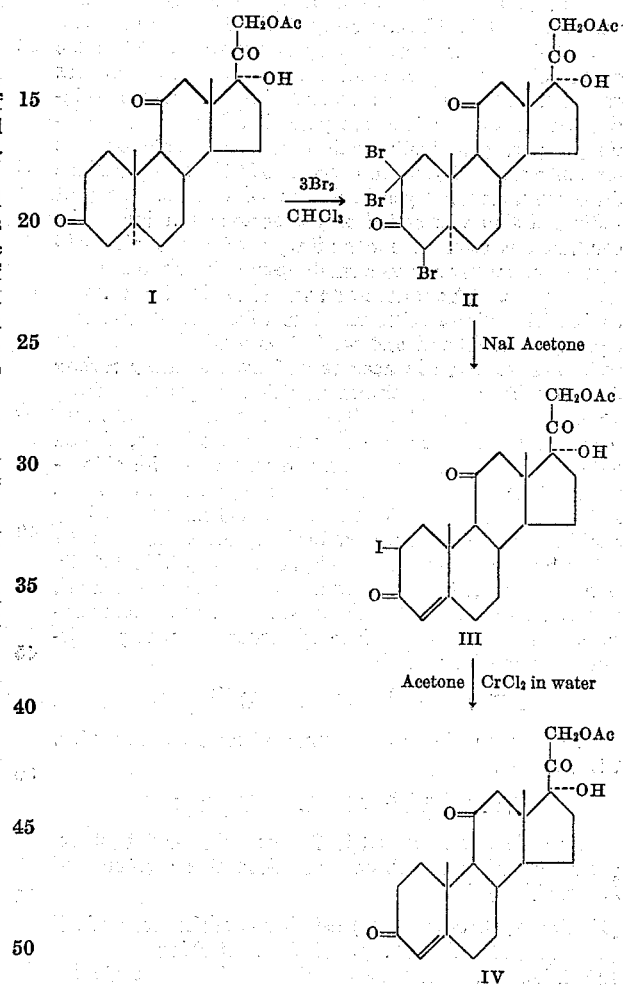

While it is preferred to prepare the new 2,2,4-tribromo-3-ketoallosteroids from 3-ketoallosteroids by use of three moles of bromine, these new 2,2,4-tribromo steroids may also be prepared by brominating 2-bromo, 2,4-dibromo, 4-bromo, and 2,2-dibromo-3-ketoallosteroids in an inert nonpolar organic solvent with an amount of bromine calculated to produce the new 2,2,4-tribromo-3-ketoallosteroids. For example, if a 2-bromo or 4-bromoallosteroid is to be brominated to a 2,2,4-tribromo-allosteroid, two moles of bromine would be needed whereas only one mole would be required if a 2,2 or 2,4-dibromoallosteroid was used as the starting material.

Another method for introducing a double bond between the carbons located in the 4 and 5 positions of 3-ketoallosteroids comprises brominating 3-keto-bisnor-allo-cholanic acid with three moles of bromine, dehydrobrominating with sodium iodide, and reducing with chromous chloride to yield 3-keto-Δ⁴-bisnor cholenic acid. The reaction is illustrated as follows:

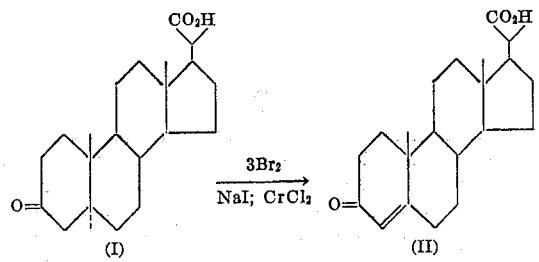

A more comprehensive understanding of this invention is obtained by reference to the following examples:

Example 1

1.011 g. (.0025 m.) of allodihydro cortisone acetate was dissolved in 35 cc. freshly distilled chloroform and treated all at once at room temperature with .00825 mole of bromine in 15 cc. chloroform. Decolorization was completed in about ten minutes. The chloroform solution was washed with water, potassium bicarbonate solution, water, and finally with brine. The solution was concentrated to dryness in vacuo at 35° C. and the residue dissolved under nitrogen in 400 cc. of acetone. 10 g. of sodium iodide was added to the acetone solution. The solution was refluxed under nitrogen 48 hours with subsequent concentration to a small volume in vacuo at room temperature. The concentrate was diluted to 500 cc. with sodium thiosulfate solution. The yellow solid that precipitates was filtered and washed well with water. The solid was dissolved in acetone and treated under carbon dioxide with aqueous chromous chloride (prepared from 15 g. chromic chloride). The mixture was kept at room temperature under carbon dioxide for two hours, diluted with a large volume of water, and extracted with chloroform. The chloroform layer was washed with water, sodium bicarbonate solution, water, and finally dried by distilling to a small volume at ordinary pressures. To the chloroform concentrate 1.5 cc. acetic anhydride–0.5 cc. pyridine was added, the solution was refluxed one hour, and concentrated to dryness in vacuo at room temperature. The crystalline residue was triturated with petroleum ether and filtered.

U.V. $\lambda_{Max}^{CH_3OH}$ 2400 A.   $E_{1\,cm.}^{1\%}$ 259

The yellow solid was recrystallized from acetone, M.P. 217–222° C.

U.V. $\lambda_{Max}^{CH_3OH}$ 2380 A.   $E_{1\,cm.}^{1\%}$ 266

The solid was dissolved in 900 cc. ether and 1800 cc. petroleum ether and chromatographed over a column of 200 g. silica gel.

(1) Ether-pet. ether (1:2)=4 liters—slight trace of oil
(2) Ether-pet. ether (1:1)=1500 cc.—nothing
(3) Ether-pet. ether (2:1)=2 liters—slight trace of oil
(4) Ether, 2 liters—solid recrystallized from acetone, M.P. 222–228° C.

U.V. $\lambda_{Max}^{CH_3OH}$ 2380 A.   $E_{1\,cm.}^{1\%}$ 167

(5) Ether, 2 liters—solid recrystallized from acetone, M.P. 241–246° C.

U.V. $\lambda_{Max}^{CH_3OH}$ 2380 A.   $E_{1\,cm.}^{1\%}$ 314

This material gave no depression of M.P. with cortisone acetate.

(6) Chloroform, 1 liter—nothing

Fraction 5 was again recrystallized from chloroform-ether and dried in vacuo at 50° C.

U.V. $\lambda_{Max}^{CH_3OH}$ 2380 A.   $E_{1\,cm.}^{1\%}$ 382

Infra red—in solution identical with cortisone acetate.

Example 2

865 mg. (.0025 m.) of 3-keto-bisnor-allocholanic acid (I) was dissolved in 35 cc. chloroform and treated all at once with .00825 mole of bromine dissolved in 15 cc. chloroform. The solution was kept at room temperature ten minutes, washed with water, potassium bicarbonate solution, water, and brine. The chloroform solution was dried, filtered, and the filtrate concentrated dry in vacuo at 35° C. The residue was dissolved under nitrogen in 400 cc. acetone and 10 g. sodium iodide was added. The solution was refluxed under nitrogen for 48 hours and then concentrated to a volume of 100 cc. in vacuo at room temperature. The concentrate was diluted with sodium thiosulfate solution to 1 liter and the resulting yellow solid filtered and washed well with water. The solid was dehalogenated in acetone under carbon dioxide with chromous chloride. The reduction mixture was diluted with water and extracted with chloroform. The chloroform layer was washed with sodium bicarbonate solution and then water. The chloroform layer was freed of water and the chloroform removed at room temperature in vacuo. The crystalline residue was recrystallized from aqueous acetone, M.P. 173–174° C. λ max. 2400 A., E% 443. A mixed melting point with an authentic sample of 3-keto-Δ⁴-bisnor-cholenic acid gave no depression.

What is claimed is:

1. The process of producing 2,2,4-tribromo-3,11,20-triketo-17-α-hydroxy-21-acetoxy allopregnane which comprises reacting 3,11,20-triketo-17-α-hydroxy-21-acetoxy allopregnane with three moles of bromine to produce 2,2,4-tribromo-3,11,20-triketo-17-α-hydroxy - 21 - acetoxy allopregnane.

2. The process which comprises reacting 3,11,20-triketo-17α - hydroxy - 21 - alkanoyloxy - allopregnane with three moles of bromine to produce 2,2,4-tribromo-3,11,20-triketo-17α-hydroxy-21-alkanoyloxy-allopregnane.

3. The process which comprises reacting 2,2,4-tribromo-3,11,20-triketo-17α-hydroxy-21-alkanoyloxy -allopregnane with sodium iodide to form 2-iodo-Δ⁴-3,11,20-triketo-17α-hydroxy-21-alkanoyloxy-pregnene.

4. The process which comprises reacting 2,2,4-tribromo-3,11,20-triketo - 17α-hydroxy - 21-acetoxy-allopregnane with sodium iodide to form 2-iodo-Δ⁴-3,11,20-triketo-17α-hydroxy-21-acetoxy-allopregnene.

5. The process which comprises reacting 3,11,20-triketo-17α - hydroxy - 21 - alkanoyloxy - allopregnane with three moles of bromine to produce the corresponding 2,2,4-tribrominated derivative thereof, and reacting this tribrominated intermediate with sodium iodide to form 2-iodo-Δ⁴-3,11,20-triketo-17α-hydroxy - 21 - alkanoyloxy-pregnene.

References Cited in the file of this patent

UNITED STATES PATENTS

| | | |
|---|---|---|
| 2,340,388 | Inhoffen | Feb. 1, 1944 |
| 2,590,978 | Kendall | Apr. 1, 1952 |
| 2,703,805 | Rosenkranz | Mar. 8, 1955 |

OTHER REFERENCES

Rosenkranz et al.: Nature 168, 28 (July 7, 1951).